(12) United States Patent
Ries et al.

(10) Patent No.: US 6,680,093 B1
(45) Date of Patent: Jan. 20, 2004

(54) MULTILAYER COMPOSITES

(75) Inventors: Hans Ries, Marl (DE); Michael Schlobohm, Dorsten (DE); Guido Schmitz, Dülmen (DE)

(73) Assignee: Degussa AG, Dusseldorf (DE)

( * ) Notice: Subject to any disclaimer, the term of this patent is extended or adjusted under 35 U.S.C. 154(b) by 0 days.

(21) Appl. No.: 09/079,696

(22) Filed: May 15, 1998

(30) Foreign Application Priority Data

May 15, 1997 (DE) .......................... 197 20 317

(51) Int. Cl.[7] ............................ B29C 47/06; B32B 1/08
(52) U.S. Cl. ...................... 428/36.6; 138/137; 428/36.7; 428/36.9; 428/36.91; 428/421; 428/422; 428/423.7; 428/473.5; 428/475.8; 428/474.7; 428/475.2; 428/483
(58) Field of Search .................. 428/421, 422, 428/473.5, 475.8, 36.91, 36.6, 36.7, 36.9, 35.2, 423.7, 474.7, 475.2, 483

(56) References Cited

U.S. PATENT DOCUMENTS

| | | | |
|---|---|---|---|
| 2,071,250 A | 2/1937 | Carothers | 260/106 |
| 2,071,251 A | 2/1937 | Carothers | 18/54 |
| 2,130,523 A | 9/1938 | Carothers | 260/124 |
| 2,130,948 A | 9/1938 | Carothers | 18/54 |
| 2,146,209 A | 2/1939 | Graves | 260/2 |
| 2,241,322 A | 5/1941 | Hanford | 260/2 |
| 2,312,966 A | 3/1943 | Hanford | 260/78 |
| 2,512,606 A | 6/1950 | Bolton et al. | 260/78 |
| 3,393,210 A | 7/1968 | Speck | 260/371 |
| 4,246,374 A | 1/1981 | Kopchik | 525/329 |
| 5,061,757 A | 10/1991 | Warner | 525/179 |
| 5,258,213 A * | 11/1993 | Mugge et al. | 428/36.91 |
| 5,278,231 A | 1/1994 | Chundury | 525/66 |
| 5,317,059 A | 5/1994 | Chundury et al. | 525/66 |
| 5,475,058 A | 12/1995 | Horiuchi et al. | 525/166 |
| 5,500,263 A * | 3/1996 | Rober et al. | 428/36.6 |
| 5,512,342 A * | 4/1996 | Rober et al. | 428/36.91 |
| 5,554,425 A | 9/1996 | Krause et al. | 428/36.91 |
| 5,554,426 A * | 9/1996 | Rober et al. | 428/36.91 |
| 6,451,395 B1 * | 9/2002 | Ries et al. | 428/36.8 |

FOREIGN PATENT DOCUMENTS

| | | | | |
|---|---|---|---|---|
| DE | 24 07 155 | 8/1974 | | |
| DE | 24 07 156 | 8/1974 | | |
| DE | 27 12 987 | 9/1981 | | |
| DE | 21 52 194 | 9/1984 | | |
| DE | 30 06 961 | 3/1985 | | |
| DE | 25 23 991 | 7/1988 | | |
| DE | 38 21 723 | 9/1989 | | |
| DE | 42 14 383 | 9/1993 | | |
| DE | 44 34 530 | 3/1995 | | |
| EP | 0396336 | * 11/1990 | ........... | C08K/5/524 |
| EP | 0 523 644 | 1/1993 | | |
| EP | 0 542 182 | 5/1993 | | |
| EP | 0 569 681 | 11/1993 | | |
| EP | 0 569 683 | 11/1993 | | |
| EP | 0 618 390 | 10/1994 | | |
| EP | 0 637 511 | 2/1995 | | |
| EP | 0 649 739 | 4/1995 | | |
| EP | 0 673 762 | 9/1995 | | |
| EP | 0 730 115 | 9/1996 | | |
| JP | 7-053823 | 2/1995 | | |
| JP | 7-053824 | 2/1995 | | |

* cited by examiner

*Primary Examiner*—Sandra M. Nolan
(74) *Attorney, Agent, or Firm*—Oblon, Spivak, McClelland, Maier & Neustadt, P.C.

(57) ABSTRACT

A multilayer composite comprises a layer configuration A/C/B or A/C/B/C/A, wherein I. each layer A comprises a molding composition that comprises at least 50% by weight of a polymer A containing amino groups;

II. layer B comprises a molding composition that consists of at least 50% by weight of a thermoplastic polyester or fluoropolymer B;

III. each layer C comprises a molding composition that consists essentially of the following components a)–c):
  a) from 5 to 95 parts by weight of the polymer A,
  b) from 95 to 5 parts by weight of the polymer B, and
  c) from 1 to 90 parts by weight of a compatibilizer comprising an alkyl acrylate polymer.

15 Claims, No Drawings

MULTILAYER COMPOSITES

BACKGROUND OF THE INVENTION

1. Field of the Invention

The present invention relates to a three component coupling agent and a multilayer composite produced using the coupling agent.

2. Discussion of the Background

In the development of multilayer composites used, for example, as pipes for conveying liquid or gaseous media in motor vehicles, the molding compositions used have to be sufficiently resistant to the media being conveyed and the pipes have to meet all the mechanical demands placed on them. Such requirements are, for example, specified in the relevant standards (DIN 73378; SAE J2260) or else set down in the specifications of the major motor vehicle manufacturers (e.g., General Motors GM213M; Opel GNIE08100; Ford WSS-M98D33-A).

A particularly critical point is the stability of the adhesion between layers, even after long-term contact with hot, alcohol-containing liquids, such as alcohol-containing fuels or water/ethylene glycol mixtures.

In most conventional multilayer pipes, the adhesion between the polyamide layers (which give the pipes their strength) and the corresponding barrier or protective layers, is produced by the use of coupling agents. Such composites are described, for example, in DE-A-38 21 723, DE-A-42 14 383, DE-A-44 34 530, EP-A-0 618 390 and EP-A-0 649 739.

However, it has frequently been found that the bonds between the components of the composite (A and B) and a coupling agent (C) have only limited resistance to attack by the media conveyed. After prolonged contact, particularly at elevated temperatures, the bond is broken, leading to an unacceptable decrease in the adhesion forces up to and including total loss of adhesion or delamination.

For this reason, attempts have been made to achieve adhesion at the layer interfaces by means of material compatibility, by using melt mixtures of the two components A and B as the coupling agent C (EP-A-0 523 644; JP Kokai 7-53823; DE-A-44 34 530). Theoretically, if the components A and B are themselves fuel-resistant, no separation would occur at the interface A to C or B to C if it were possible, at each of the interfaces, to bond a sufficiently high proportion of the component A present in the C layer to the layer A and a sufficiently high proportion of the component B present in the C layer to the layer B.

However, such 2-component blends generally have the problem that the two incompatible components A and B demix in the shear and tensile flows occurring during processing. In general therefore, a bond to only one of the two components is obtained. Furthermore, the morphology of the coupling agent layer is usually fibrous. Thus the coupling agent has an insufficiently high mechanical strength and only relatively low peel strengths are obtained as measured in accordance with ISO 8033.

Attempts have been made to avoid demixing of the components A and B in the coupling agent C by addition of a compatibilizer. Particularly in the bonding of polyamide to fluoropolymers, preference has been given to using thermoplastic polyurethanes (TPU) (JP-A-07053824). However, if one of the two components A and B comprises a fluoropolymer, temperatures of 230° C. and above are required for processing the coupling agent. This leads, particularly at relatively long residence times, to degradation of the TPU which drastically reduces the effectiveness and the processing friendliness of the coupling agent. Furthermore, it has been found that the viscosity of conventional TPU molding compositions is too low. Thus it cannot exert a sufficiently high stress on components A and B in the compounding step to disperse A and B sufficiently finely in one another. These high stresses, however, are needed to effect an additional mechanical interlocking of the components which would be sufficient, in the case of a theoretically conceivable failure of the bond at the interfaces of the individual phases within the coupling agent, to continue to ensure a sufficiently high-quality mechanical bond.

In the case of such coupling agents, achievement of sufficient adhesion is still strongly dependent on the tensile and shear stresses that occur. This means that the adhesion of a multilayer composite in the form of a high profile, a film, a blown article or multicomponent injection molding also depends strongly on the geometry of the article, the tool design and the processing conditions.

Another alternative has been proposed in EP-A-0 618 390 and EP-A-0 649 739. In these documents, the coupling agent comprises two components, one of which is identical to the material of layer A and the other is compatible with the material of layer B. These two components of the coupling agent, likewise have a certain level of compatibility. In the concrete example of the use of polyamide as layer material A and polyvinylidene fluoride as layer material B, the coupling agent is a blend of polyamide and a poly(alkyl acrylate) or a polyglutarimide.

Although good initial strengths are obtained with these composites, upon thermal stressing of the composite, the strength is partially or even completely lost, depending on the conditions selected. This is a serious problem, for example in the thermoforming of corresponding multilayer pipes, if the customary heat treatment times are exceeded due to a fault.

Multilayer pipes that are used in the motor vehicle sector as fuel lines usually have a high stiffness. Since they cannot be laid as a straight conduit in a passenger car, these lines have to be thermoformed. In this reshaping processing, the previously straight pipe is permanently bent so that it retains bends and curvatures of the particular points required.

A method of thermoforming pipes which is currently widely employed is thermoforming using polyethylene glycol. In this process, the pipe is generally laid into a template, and together with the template, immersed in a polyethylene glycol bath. This bath is heated to a temperature appropriate for the material of which the pipe is made, so that the pipe warms up from the outside and becomes soft. The internal resistance of the pipe against bending is thus decreased, i.e. the stresses introduced by bending are relaxed. However, it has been found that this also reduces the adhesion at the interfaces of the composite to values that, in many cases, are no longer acceptable.

If multilayer pipes are used as lines for cooling fluid, such susceptibility likewise has to be expected.

SUMMARY OF THE INVENTION

Accordingly, one object of the present invention is to provide a coupling agent for multilayer composites in which the two incompatible components A and B do not demix during processing and which has a high mechanical strength as an applied layer.

A further object of the present invention is to provide a coupling agent for use in preparing multilayer composites, that is made of a polymer material that is thermally stable under the processing conditions and provides a fine dispersion of components A and B in one another.

A further object of the present invention is to provide a coupling agent for use in preparing multilayer composites that gives high initial adhesion that is very largely retained on prolonged contact with organic media, such as fuels or cooling fluid, and also upon thermal stressing of the composite.

These and other objects of the present invention have been satisfied by the discovery of a coupling agent molding composition which consists essentially of the following components:

a) from 5 to 95 parts by weight of a polymer A containing amino groups;

b) from 95 to 5 parts by weight of a polymer B, preferably selected from the group consisting of thermoplastic polyesters or fluoropolymers;
wherein the sum of the components a) and b) is 100 parts by weight, and c) from 1 to 90 parts by weight of a compatibilizer comprising an alkyl acrylate polymer.

DETAILED DESCRIPTION OF THE PREFERRED EMBODIMENTS

The present invention relates to a three component coupling agent useful for preparation of multilayer composites. The coupling agent of the present invention consists essentially of a) from 5 to 95 parts by weight of a polymer A containing amino groups;

b) from 95 to 5 parts by weight of a polymer B, preferably selected from the group consisting of thermoplastic polyestersor fluoropolymers;
wherein the sum of the components a) and b) is 100 parts by weight, and c) from 1 to 90 parts by weight of a compatibilizer comprising an alkyl acrylate polymer.

The polymer A containing amino groups can be any amino group containing polymer, preferably a polymer made from amino group containing monomers. Suitable examples of polymer A include, but are not limited to polyamides or aminated polyolefins.

Suitable polyamides include but are not limited to, aliphatic homopolyamides and copolyamides. Polyamides are often referred to in the art as nylons. Preferred examples are nylons 4.6, 6.6, 6.12, 8.10 and 10.10 and the like. More preferred are nylons 6, 10.12, 11, 12.12 and most preferred is nylon 12. [The naming of the nylons corresponds to the international standard, with the first digit(s) indicating the number of carbon atoms of the starting diamine and the last digit(s) indicating the number of carbon atoms of the dicarboxylic acid. If only one figure is given, this means that the polyamide is derived from an α,ω-aminocarboxylic acid or from the corresponding lactam - H. Domininghaus, Die Kunststoffe und ihre Eigenschaften, page 272, VDI Verlag (1976).]

If copolyamides are used, these can comprise, for example, adipic acid, sebacic acid, suberic acid, isophthalic acid or terephthalic acid as coacid and/or bis(4-aminocyclohexyl) methane, trimethylhexamethylenediamine, hexamethylenediamine or the like as codiamine.

The preparation of these polyamides is known (e.g. D.B. Jacobs, J. Zimmermann, Polymerization Processes, pp. 424–67, Interscience Publishers, New YorkI1977): DE-B 21 52 194, the content of which is hereby incorporated by reference).

Likewise suitable as polyamides are mixed aliphatic/aromatic polycondensates, such as those described in U.S. Pat. No. 2,071,250, 2,071,251, 2,130,523, 2,130,948, 2,241, 322, 2,312, 966, 2,512,606, 3,393,210 or in Kirk-Othmer, Encyclopedia of Chemical Technology, 3rd edition, vol. 18, Wiley & Sons (1982), pp. 328 and 435, the relevant portions of which are hereby incorporated by reference. Other polycondensates which are suitable as polyamides are poly(ether ester amides) and poly(etheramides). Such products are described, for example, in DE-A 27 12 987, 25 23 991 and 30 06 961, also incorporated by reference.

In the polyamide, it is preferable that at least 10% of all end groups present are amino end groups. Particular preference is given to using polyamides in which at least 50% and, more preferably at least 70% of all of the end groups present in the polyamide are amino end groups. Furthermore, it is preferred that the amino end group concentration in the polyamide ranges from 30 to 130 mmol/kg, more preferably from 50 to 110 mmol/kg.

Aminated polyolefins can be prepared, for example, by reacting a polyolefin, onto which carboxylic acid or anhydride groups have been grafted, with an excess of diamine or by other conventional methods.

Polymer B can be selected from a variety of polymers, including, but not limited to, thermoplastic polyesters and fluoropolymers.

The thermoplastic polyesters useful as polymer B in the present invention have the following basic structure

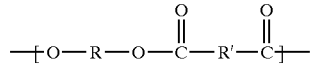

where R is a divalent, branched or unbranched aliphatic and/or cycloaliphatic radical having from 2 to 12, preferably from 2 to 8, carbon atoms in the carbon chain and R' is a divalent aromatic radical having from 6 to 20, preferably from 8 to 12, carbon atoms in the carbon skeleton.

Examples of suitable diols for preparation of the polyesters include, but are not limited to, ethylene glycol, trimethylene glycol, tetramethylene glycol, hexamethylene glycol, neopentyl glycol, cyclohexanedimethanol and the like.

Up to 25 mol % of the diol can be replaced by a second diol selected from those already mentioned above or by a diol having the following formula

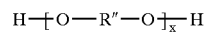

where R" is a divalent radical having from 2 to 4 carbon atoms and x can have a value from 2 to 50.

Diols which are preferably used are ethylene glycol and, in particular, tetramethylene glycol (also known as butylene glycol).

Suitable aromatic dicarboxylic acids for preparation of the polyesters include, but are not limited to, terephthalic acid, isophthalic acid, 1,4-, 1,5-, 2,6- or 2,7-naphthalenedicarboxylic acid, diphenic acid and (diphenyl ether)-4,4'-dicarboxylic acid. Preference is given to terephthalic acid. Alternatively, the di-lower alkyl esters of these acids can also be used in conjunction with the diols to prepare the polyesters of the present invention, in accordance with conventional polymerization procedures.

(Within the context of the present invention, the term "lower alkyl" indicates an alkyl group containing from 1 to 4 carbon atoms.)

Up to 20 mol % of these dicarboxylic acids can be replaced by aliphatic dicarboxylic acids such as succinic acid, maleic acid, fumaric acid, sebacic acid and dodecanedioic acid or their di-lower alkyl esters.

The thermoplastic polyesters can be prepared by conventional methods such as those disclosed in DE-A 24 07 155, 24 07 156; and Ullmanns Encyclopädie der technischen Chemie, 4th edition, vol. 19, pages 65 ff. -Verlag Chemie GmbH, Weinheim, 1980, both of which are incorporated by reference.

The polyester can comprise from 1 to 40% by weight of a compound containing at least two isocyanate groups as described, for example, in EP-A-0 569 681 which is hereby incorporated by reference.

The polyester can equally well comprise from 1 to 40% by weight of a compound containing at least two epoxy groups as described, for example, in EP-A-0 542 182 which is hereby incorporated by reference.

Similarly, the polyester can also comprise from 1 to 40% by weight, preferably from 1 to 10% by weight and more preferably from 1 to 5% by weight, of a compound containing at least two oxazoline groups such as m-phenylenebisoxazoline, p-phenylenebisoxazoline, tetramethylenebisoxazoline, hexamethylenebisoxazoline or decamethylenebisoxazoline.

Suitable fluoropolymers for use as polymer B include, but are not limited to, for example, modified ethylene-tetrafluoroethylene copolymers (ETFE; such as Neoflon EP610 from Daikin Industries), tetrafluoroethylene-hexafluoropropene-vinylidene fluoride ter-polymers (THV; such as THV 500 from 3M), ethylene-chlorotrifluoroethylene copolymers (ECTFE; such as Halar from Ausimont) or polyvinylidene fluoride (PVDF).

ETFE, THV and ECTFE are described, for example, in H. Domininghaus, Die Kunststoffe und ihre Eigenschaften, 4th edition, chapter 2.1.7 (Fluoropolymers), hereby incorporated by reference.

The preparation and structure of polyvinylidene fluoride are likewise known (Hans R. Kricheldorf, Handbook of Polymer Synthesis, Part A, Marcel Dekker Inc. New York-Basle-Hong Kong, p. 191 ff.; Kunststoff-Handbuch, 1st edition, volume XI, Carl Hanser Verlag, Munich (1971), p. 403 ff., also incorporated by reference).

According to the present invention, polymers based on polyvinylidene fluoride and comprising up to 40% by weight of other monomers may also be present. Examples of such additional monomers are trifluoroethylene, ethylene, propene and hexafluoropropene.

The alkyl acrylate polymer of component C preferably comprises the following basic building blocks:

i) from 20 to 100% by weight, preferably from 14 to 85% by weight, more preferably from 30 to 70% by weight, of units of formula (I)

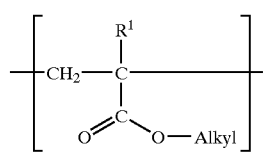

ii) from 0 to 80% by weight, preferably from 10 to 75% by weight, more preferably from 20 to 40% by weight, of units of formula (II)

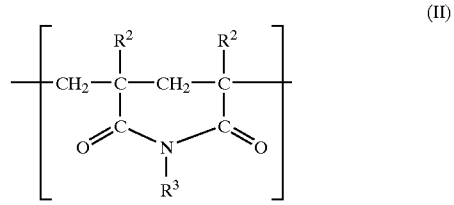

iii) from 0 to 30% by weight, preferably from 0 to 15% by weight, more preferably from 1 to 15% by weight, of units of formula (III)

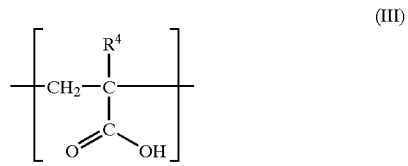

iv) from 0 to 20% by weight, preferably from 7 to 20% by weight, more preferably from 8 to 12% by weight, of units of formula (IV)

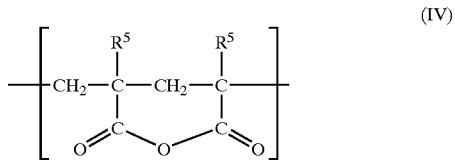

where Alkyl=linear or branched (where possible) methyl, ethyl, propyl, butyl, pentyl, hexyl, and
$R^1$ to $R^5 = (C_nH_{2n+1})$ where n=0–6
and each of Alkyl and $R^1$ to $R^5$ can be identical or different.

Preference is given to those basic building blocks in which alkyl and $R^1$ to $R^5$ are each a methyl group.

In addition, other monomers may be present in copolymerized form up to a maximum of 50% by weight. Examples of such further monomers includes ethene, styrene, maleic anhydride, itaconic acid, glycidyl acrylate and/or glycidyl methacrylate.

Polymers comprising the basic building block ii) are also known as polyglutarimides. These are poly(alkyl acrylates) in which two adjacent carboxylate groups have been reacted to form a cyclic acid imide. Imide formation is preferably carried out using ammonia or primary amines such as methylamine. If aqueous solutions of these are used, groups of the type iii) and iv) are simultaneously formed to a certain extent by hydrolysis of carboxylate groups in a secondary reaction. The products used according to the invention and their preparation are known (Hans R. Kricheldorf, Handbook of Polymer Synthesis, Part A, Marcel Dekker Inc. New York-Basle-Hong Kong, p. 223 ff.; H. G. Elias, Makromolekule, Huthig und Wepf Verlag Basle-Heidelberg-New York; U.S. Pat. No. 2,146,209 and 4,246,374, hereby incorporated by reference).

The coupling agent of the present invention preferably consists essentially of the following components:

a) from 20 to 80 parts by weight of a polymer A containing amino groups,
b) from 80 to 20 parts by weight of a polymer B, where the sum of the components a) and b) is 100 parts by weight, and c) from 2 to 30 parts by weight of an alkyl acrylate polymer.

The coupling agent of the invention is preferably used for producing multilayer composites comprising the layer configuration A/C/B or A/C/B/C/A, where I. each layer A comprises a molding composition which comprises at least 50 % by weight of a polymer A containing amino groups, as explained above, and
II. the layer B comprises a molding composition which comprises at least 50% by weight of the polymer B.

The remaining 50% by weight can be other thermoplastics, so long as these do not interfere with the properties according to the invention. For example, these other thermoplastics can include rubber as an impact-modifying component, or customary auxiliaries and additives such as flame retardants, viscosity improvers, stabilizers, plasticizers, processing aids, fillers, pigments or reinforcing fibers. The amount of these materials added should be such that the desired properties of the multilayer composite are not seriously impaired.

The multilayer composite of the invention has, in the preferred case, an adhesion between the layer C and the layers A and B, measured in accordance with ISO 8033, in each case of at least 10 N/cm.

In one embodiment, the multilayer composite of the invention is a pipe or a container, in particular for conveying or storing liquids or gases. Such a pipe can be straight, corrugated or corrugated only in some sections. The preparation of corrugated pipes is known. Important applications include use as a fuel line, as a tank filling port, as a vapor line (i.e. a line in which fuel vapors are conveyed, e.g. breather lines), as a gas station line, as a line for cooling fluid or as a fuel container. In all of these cases, it is preferred that either the layer A or the layer B comprises a material which has sufficient barrier action against diffusion of the medium to be conveyed. The choice of such materials according to their barrier properties is well within the purview of one of ordinary skill in the art.

The multilayer composite of the present invention can also be in the form of a sheet-like composite, for example as a packaging film for foodstuff, as a film or composite having a covering layer for improving the UV resistance or as an extruded multilayer board in which, for instance, a fluoropolymer covering layer provides protection against writing on the board (antigrafitti).

When the multilayer composite of the present invention is used for conveying or storing flammable liquids, gases or dusts (e.g. fuel or fuel vapors) it is advisable to make one of the layers belonging to the composite, or an additional inner layer, electrically conductive. This can be achieved by compounding an electrically conductive additive into the layer using conventional methods. Conductive additives which can be used are, for example, conductivity black, metal flakes, metal powder, metallized glass spheres, metallized glass fibers, metal fibers (such as stainless steel), metallized whiskers, carbon fibers (also metallized), intrinsically conductive polymers or, particularly preferred, graphite fibrils as described in EP-A-0 730 115 (hereby incorporated by reference). It is also possible to use mixtures of various conductive additives.

In the preferred case, the electrically conductive layer is in direct contact with the medium to be conveyed or stored and has a surface resistance of at most $10^9$ Ωcm.

If the multilayer composite of the invention is configured as a pipe, the latter can also be sheathed with an additional elastomer layer. Both crosslinking rubber compositions and thermoplastic elastomers are suitable for the sheathing. The sheathing can be applied to the pipe either with or without use of an additional coupling agent, for example by means of extrusion through a crosshead die or by pushing a prefabricated elastomer hose over the finished extruded multilayer pipe.

The manufacture of the multilayer composites can be carried out in one or more stages, for example by means of a single-stage process such as coextrusion or coextrusion blow molding or by means of multistage processes as described, for example, in U.S. Pat. No. 5,554,425, hereby incorporated by reference.

Having generally described this invention, a further understanding can be obtained by reference to certain specific examples which are provided herein for purposes of illustration only and are not intended to be limiting unless otherwise specified.

EXAMPLES

Component a):

PA 1: Nylon 12, plasticizer-free ($n_{rel}$=2.1; amino end group content: 12 mmol/kg; carboxyl end group content: 48 mmollkg).

PA 2: Nylon 12, plasticizer-containing, impact-modified ($n_{rel}$=2.1; amino end group content: 13 mmol/kg; carboxyl end group content: 48 mmovkg; plasticizer content per 100 parts by weight of polyamide: 11 parts by weight of N-n-butylbenzensulfonamide; plus 5 parts by weight of ethylene-propylene rubber modified with maleic anhydride).

PA 3: Nylon 12, plasticizer-containing ($n_{rel}$=2.1; amino end group content: 50 mmol/kg; carboxyl end group content: 12 mmol/kg; plasticizer content per 100 parts by weight of polyamide: 15 parts by weight of N-n-butylbenzenesulfonamide).

Component b)

PVDF 1: Polyvinylidene fluoride (melt flow index: 12 g/10 min; DYFLOR LE, Hüls AG).

PBT 1: Polybutylene terephthalate, VESTODUR 200, Hüls AG.

PBT 2: Polybutylene terephthalate modified as described in EP-A-0 569-683 (VESTODUR X 7298, Hüls AG).

Component c):

AAE: Methyl methacrylate polymer containing 56% by weight of basic building block i), 30% by weight of basic building block ii), 4% by weight of basic building block iii), and 10% by weight of basic building block iv).

The blends shown in Table 1 were prepared by melt mixing on a twin-screw compounder at a melt temperature of from 260° C. to 280° C.

To determine the usability of these blends as coupling agents, 2-layer tapes were first coextruded and tested manually for separability of the layers. If the layers could not be separated, the adhesion was assessed as "good". If separation could be achieved using only a small amount of force, the adhesion was judged as "moderate". In the case of composites whose layers could be separated without application of appreciable force, the adhesion was classified as "none".

In addition, 3-layer pipes having dimensions of 8×1 mm were produced with variation of the processing conditions. The extrusion die used for this purpose was designed for layer thicknesses (from the outside inward) of 0.60/0.2/0.2 mm. The quality of the adhesion between layers in these pipes was determined by means of the peel test accordance with ISO 8033 (see Table 2).

The mixtures designated by R and the examples denoted by N are comparative examples not in accordance with the present invention.

TABLE 1

Composition of the blends (examples denoted by R are not according to the invention); amounts of starting materials are in parts by weight.

| | R1 | Z1 | Z2 | R2 | Z3 | Z4 | Z5 | R3 | Z6 | Z7 | Z8 | Z9 | R4 | R5 | R6 |
|---|---|---|---|---|---|---|---|---|---|---|---|---|---|---|---|
| Component | | | | | | | | | | | | | | | |
| PA 1 | 44 | 44 | 44 | | | | | | | | | 37 | | | |
| PA 2 | | | | 44 | 44 | 59 | 30 | 37 | 52 | 37 | 24 | | 100 | | |
| AAE | — | 3 | 12 | — | 7 | 7 | 7 | — | 5 | 3 | 4 | 5 | 51 | 8 | — |
| PBT 1 | 56 | 56 | 56 | | | | | | | | | | | | |
| PBT 2 | | | | 56 | 56 | 41 | 70 | | | | | | | | 100 |
| PVDF 1 | | | | | | | | 63 | 48 | 63 | 76 | 63 | | 100 | |
| (Adhesion to) | | | | | | | | | | | | | | | |
| PA 2 | none | good | good | none | good | good | good | moderate | good | good | good | good | good | good | |
| PBT 1 | none | good | good | none | good | good | good | | | | | | | | good |
| PVDF 1 | | | | | | | | none | good | good | good | good | good | good | |
| PA 3 | none | good | good | moderate | good | good | good | moderate | good | good | good | good | good | good | good |
| PBT 2 | none | good | good | none | good | good | good | | | | | | | | good |

TABLE 2

Layer adhesion of 3-layer pipes with terblends as coupling agent (separation force in N/cm measured in accordance with ISO 8033; the examples denoted by N are not according to the invention)

| Example | Order of layers (from the outside inward) | Offtake speed | Separation force outside/ middle | Separation force inside/ middle | Remarks |
|---|---|---|---|---|---|
| 1 | 0.8 mm PA2/ 0.1 mm Z3/ 0.1 mm PBT 1 | 15 m/min | 31 | 28 | |
| 2 | 0.6 mm PA2/ 0.1 mm Z3/ 0.3 mm PBT 1 | 15 m/min | 27 | 30 | |
| 3 | 0.8 mm PA2/ 0.1 mm Z3/ 0.1 mm PBT 1 | 30 m/min | 26 | 29 | |
| 4 | 0.8 mm PA2/ 0.1 mm Z7/ 0.1 mm PVDF 1 | 15 m/min | 29 | 27 | |
| 5 | 0.6 mm PA2/ 0.1 mm Z7/ 0.3 mm PVDF 1 | 7 m/min | 24 | 25 | |
| 6 | 0.8 mm PA2/ 0.1 mm Z7/ 0.1 mm PVDF 1 | 30 m/min | 26 | 27 | |
| N1 | 0.6 mm PA2/ 0.2 mm PA3/ 0.2 mm R6 | 15 m/min | not able to be separated | 39 | Composite as described in EP-A-0 569 683 |
| N2 | 0.8 mm PA2/ 0.1 mm R4/ 0.1 mm PVDF 1 | 15 m/min | not able to be separated | 41 | Composite as described in EP-A-0 618 390 |
| N3 | 0.6 mm PA2/ 0.2 mm PA2/ 0.2 mm R5 | 15 m/min | not able to be separated | 45 | Composite as described in EP-A-0 637 511 |

TABLE 3

Layer adhesion of 3-layer pipes with terblends as coupling agent after storage completely immersed in polyethylene glycol (separation force in N/cm measured in accordance with ISO 8033; the examples denoted by N are not according to the invention)

Polyethylene glycol, 160° C., 2 hours

| Example | Separation force, outside/middle | Separation force, inside/middle | Remarks |
|---|---|---|---|
| 1 | 25 | 27 | |
| 2 | 27 | 29 | |
| 3 | 24 | 28 | |
| 4 | 25 | 26 | |
| 5 | 21 | 25 | |
| 6 | 27 | 23 | |
| N1 | not able to be separated | 0 | Composite as described in EP-A-0569 683 |
| N2 | not able to be separated | 5 | Composite as described in EP-A-0 618 390 |
| N3 | not able to be separated | 10 | Composite as descried in EP-A-0 637 511 |

What is claimed is:

1. A multilayer composite comprising a layer configuration A/C/B or A/C/B/C/A, wherein
   I. each layer A comprises a molding composition that comprises at least 50% by weight of a polymer A containing amino groups selected from the group consisting of polyamides, aminated polyolefins, poly(ether ester amide)s or poly (ether amide)s;
   II. layer B comprises a molding composition that consists of at least 50% by weight of a polymer B selected from the group consisting of thermoplastic polyester or fluoropolymer;
   III. each layer C comprises a molding composition that consists essentially of the following components a)–c):
      a) from 5 to 95 parts by weight of the polymer A,
      b) from 95 to 5 parts by weight of the polymer B, where the sum of the components a) and b) is 100 parts by weight, plus
      c) from 1 to 90 parts by weight of a compatibilizer comprising an alkyl acrylate polymer.

2. The multilayer composite as claimed in claim 1 wherein the polymer A containing amino groups is a polyamide.

3. The multilayer composite as claimed in claim 1, wherein the fluoropolymer is polyvinylidene fluoride.

4. The multilayer composite as claimed in claim 1, wherein the alkyl acrylate polymer comprises the following basic building blocks:

i) from 20 to 100% by weight of units of formula (I)

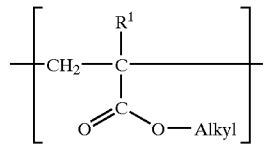

(I)

ii) from 0 to 80% by weight of units of formula (II)

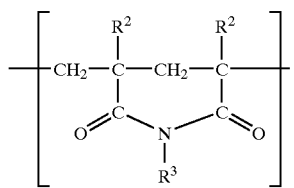

(II)

iii) from 0 to 30% by weight of units of formula (III)

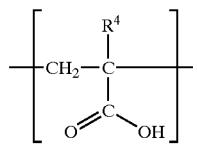

(III)

iv) from 0 to 20% by weight of units of formula (IV)

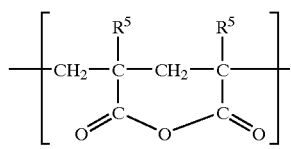

(IV)

wherein alkyl=methyl, ethyl, propyl, butyl, pentyl, or hexyl, which can be linear, branched or cyclic, where possible;

$R^1$ to $R^5 = (C_nH_{2n-1})$ where n=0–6;

and wherein each of alkyl and $R^1$ to $R^5$ can be identical or different.

5. The multilayer composite as claimed in claim 4, wherein the alkyl acrylate polymer comprises from 14 to 85% by weight of the basic building block i), from 10 to 75% by weight of the basic building block ii), from 0 to 15% by weight of the basic building block iii) and from 7 to 20% by weight of the basic building block iv).

6. The multilayer composite as claimed in claim 4, wherein the alkyl acrylate polymer comprises from 30 to 70% by weight of the basic building block i), from 20 to 40% by weight of the basic building block ii), from 1 to 15% by weight of the basic building block iii) and from 8 to 12% by weight of the basic building block iv).

7. The multilayer composite as claimed in claim 4, wherein, in the alkyl acrylate polymer alkyl and $R^1$ and $R^5$ are each a methyl group.

8. The multilayer composite as claimed in claim 1, wherein the alkyl acrylate polymer comprises, as further monomers, up to 50% by weight of one or more member selected from the group consisting of ethene, styrene, maleic anhydride, itaconic acid, glycidyl acrylate and glycidyl methacrylate.

9. The multilayer composite as claimed in claim 1, wherein layer C is bound to each of layers A and B with an adhesion, as measured in accordance with ISO 8033, of at least 10 N/cm.

10. The multilayer composite as claimed in claim 1, wherein the multilayer component is a pipe or a container.

11. The multilayer composite as claimed in claim 10, wherein the multilayer composite is a pipe that is completely corrugated or partially corrugated.

12. The multilayer composite as claimed in claim 1, wherein one of the layers of the composite or an additional inner layer is made electrically conductive.

13. The multilayer composite as claimed in claim 12, wherein the electrically conductive layer is in direct contact with the medium to be conveyed or stored and has a surface resistance of at most $10^9$ Ωcm.

14. The multilayer composite as claimed in claim 10, wherein the multilayer composite is a fuel line, is a tank filling port, a vapor line, a gas station line, a line for cooling fluid or a fuel container.

15. A multilayer composite comprising a layer configuration A/C/B or A/C/B/C/A, wherein II. each layer A comprises a molding composition that comprises at least 50% by weight of a polymer A containing amino groups selected from the group consisting of polyamides, aminated polyolefins, poly(ether ester amide)s or poly (ether amide)s;

II. layer B comprises a molding composition that consists of at least 50% by weight of a thermoplastic polyester B;

III. each layer C comprises a molding composition that consists essentially of the following components a)–c):

a) from 5 to 95 parts by weight of the polymer A, b) from 95 to 5 parts by weight of the polymer B, where the sum of the components a) and b) is 100 parts by weight, plus c) from 1 to 90 parts by weight of a compatibilizer comprising an alkyl acrylate polymer.

* * * * *